United States Patent [19]

Fujiwara et al.

[11] Patent Number: 4,814,902
[45] Date of Patent: Mar. 21, 1989

[54] APPARATUS FOR RECORDING AND/OR REPRODUCING WITH VIDEO AND MULTIPLE AUDIO ROTARY HEADS

[75] Inventors: Jiro Fujiwara; Hisayoshi Chino; Teruyuki Yoshida, all of Kanagawa; Jun Takayama, Tokyo; Katsuichi Tachi, Kanagawa; Hideto Suzuki, Kanagawa, all of Japan

[73] Assignee: Sony Corporation, Tokyo, Japan

[21] Appl. No.: 889,461

[22] Filed: Jul. 25, 1986

[30] Foreign Application Priority Data

Jul. 25, 1985 [JP] Japan .................. 60-164951
Aug. 26, 1985 [JP] Japan .................. 60-186997
Sep. 9, 1985 [JP] Japan .................. 60-199010

[51] Int. Cl.$^4$ .............................................. H04N 5/78
[52] U.S. Cl. ................................. 360/33.1; 360/22; 360/10.3
[58] Field of Search ............... 360/19.1, 22, 32, 84, 360/64, 33.1, 10.3

[56] References Cited

U.S. PATENT DOCUMENTS

| | | | |
|---|---|---|---|
| 4,563,710 | 1/1986 | Baldwin | 360/19.1 X |
| 3,934,268 | 1/1976 | Uemura | 360/10.3 X |
| 4,183,067 | 1/1980 | Kihara et al. | 360/84 |
| 4,418,366 | 11/1983 | Moriya | 360/10.2 X |
| 4,463,387 | 7/1984 | Hashimoto et al. | 360/22 X |
| 4,477,844 | 10/1984 | Nakano et al. | 360/19.1 X |
| 4,532,556 | 7/1985 | Gundry | 360/19.1 |
| 4,541,020 | 9/1985 | Kimura | 360/22 |

FOREIGN PATENT DOCUMENTS

57-119571  7/1982  Japan .

OTHER PUBLICATIONS

IBM Technical Disclosure Bulletin; vol. 11, No. 7, Dec. 68; Frost et al. "Video Recorder with Multiplex Audio".
IBM Tech. Disc. Bulletin, vol. 9, No. 10; Mar. 1967; pp. 1376; Lundell et al. "Photo Commutator".
NHK Lab Notes; Ser. No. 236; Apr. 1979; Yokoyama et al. "Experimental PCM-VTR".
7th Annual Meeting of FKTG, Sep. 17–21; 1979; Darmstadt Germany; Zahn General Survey Paper "Video Technology II";

*Primary Examiner*—Aristotelis M. Psitos
*Attorney, Agent, or Firm*—Lewis H. Eslinger

[57] ABSTRACT

An apparatus for recording and/or reproducing a signal on a tape recording medium with a plurality of rotary recording and/or reproducing heads includes a first input and/or output terminal for receiving and/or deriving a video signal, a second input and/or output terminal for receiving and/or deriving an audio signal, and a recording and/or reproducing circuit including a rotary transfer. A first rotary recording and/or reproducing head is connected to the first input and/or output terminal through the recording and/or reproducing circuit and records and/or reproduces the video signal on first parallel slant tracks of a tape recording medium. A plurality of second rotary recording and/or reproducing heads are connected to the second input and/or output terminal through the recording and/or reproducing circuit and record and/or reproduces the audio signal on second parallel slant tracks of the tape recording medium. A plurality of the second parallel slant tracks are then formed corresponding to one of the first parallel slant tracks.

12 Claims, 12 Drawing Sheets

APPARATUS FOR RECORDING AND/OR REPRODUCING WITH VIDEO AND MULTIPLE AUDIO ROTARY HEADS

BACKGROUND OF THE INVENTION

1. Field of the Invention

The present invention relates to an apparatus for recording and/or reproducing an information with a plurality of heads arranged on a rotary drum.

2. Description of the Prior Art

In a video tape recorder (hereinafter simply referred to as VTR) of 1 (or 1.5) rotary head type using a magnetic tape of 1-inch wide, that is, a VTR using a so-called SMPTE type C format, two rotary heads are mounted on a rotary drum, this rotary drum is rotated at a revolution rate of one rotation per one field and a magnetic tape is obliquely wrapped around the peripheral surface of this rotary drum at an angle of substantially 360 degrees and transported at a predetermined speed. Of the above mentioned two rotary heads, the video signal is recorded by one rotary head during its video period, while a vertical synchronizing signal is recorded by another auxiliary head during the synchronizing period in which the former rotary head is detached from the magnetic tape.

By the way, in such a format, if a reproduced signal is processed by a so-called time base corrector, even when the signal in the synchronizing period is dropped, the normal video signal can be reproduced without problem if the signal in the video period is obtained. Therefore, it may be considered that in the above mentioned format, instead of the signal in the synchronizing period, a digital PCM (pulse-code-modulated) audio signal be recorded on a skewed track which is narrow in width.

Specifically, according to the prior art format as mentioned above, the audio signal is recorded in the form of an analog signal by a stationary or fixed head. In such an analog recording, if especially the dubbing of such a recorded analog audio signal is carried out repeatedly, the analog audio signal is deteriorated considerably. On the other hand, if the audio signal is recorded in the form of a digital signal, it is possible to remove the problem that the audio signal is deteriorated in the dubbing operation.

The above mentioned system is disclosed, for example, in Japanese Laid Open Patent Application No. 57-119571.

However, in order that an audio data of one field period is recorded in the synchronizing signal track, the digital data must be time-base-compressed considerably and this makes the signal processing very difficult. In addition, the recording density (or packing density) becomes large so that the above mentioned system is difficult to be realized in the recording and/or reproducing system.

OBJECTS AND SUMMARY OF THE INVENTION

Accordingly, it is an object of this invention to provide a novel recording and/or reproducing apparatus which can remove the defects encountered with the prior art apparatus.

Another object of this invention is to provide a recording and/or reproducing apparatus in which a plurality of audio signal tracks are provided for a video signal track of one field period.

Further object of this invention is to provide a recording and/or reproducing apparatus in which a recording and/or reproducing circuit can be made common to a plurality of rotary heads, simplifying the construction of the apparatus.

Still further object of this invention is to provide a recording and/or reproducing apparatus in which even when the number of the rotary heads is large, the number of rotary transformers and the like can be reduced.

Yet further object of this invention is to provide a recording and/or reproducing apparatus in which regardless of rotary heads used, a signal can be reproduced satisfactorily by a playback head for a common signal.

According to one aspect of the present invention, there is provided an apparatus for recording and/or reproducing a signal on a tape recording medium with a plurality of rotary recording and/or reproducing heads, the apparatus comprising:

a first input and/or output terminal for receiving and/or deriving a video signal;

a second input and/or output terminal for receiving and/or deriving an audio signal;

recording and/or reproducing circuit means including rotary transformer means;

a first rotary recording and/or reproducing head connected to said first input and/or output terminal through said recording and/or reproducing circuit means and for recording and/or reproducing said video signal on first parallel slant tracks of a tape recording medium; and a plurality of second rotary recording and/or reproducing heads connected to said second input and/or output terminal through said recording and/or reproducing circuit means and for recording and/or reproducing said audio signal on second parallel slant tracks of the tape recording medium; whereby a plurality of said second parallel slant tracks are formed correspondingly to one of said first parallel slant tracks.

According to another aspect of the present invention, there is provided an apparatus for recording and/or reproducing a signal on a tape recording medium with a plurality of rotary recording and/or reproducing heads, the apparatus comprising:

a signal input and/or output terminal for receiving and/or deriving an input and/or output signal;

recording and/or reproducing circuit means including rotary transformer means; and a plurality of rotary recording and/or reproducing heads connected to said signal input terminal through said recording and/or reproducing circuit means and for recording and/or reproducing a corresponding signal to said input and/or output signal on the tape recording medium as a plurality of parallel slant tracks which are formed during one rotation of said plurality of rotary recording and/or reproducing heads; whereby said plurality of rotary recording and/or reproducing heads are arranged at predetermined angles so as not to scan simultaneously said parallel slant tracks and said recording and/or reproducing circuit means further including switching means for conducting said input and/or output signal to and/or from said plurality of rotary recording and/or reproducing heads.

These and other objects, features and advantages of the present invention will become apparent from the following detailed description of the preferred embodiments taken in conjunction with the accompanying drawings, throughout which like reference numerals designate like elements and parts.

DESCRIPTION OF THE PREFERRED EMBODIMENTS

Referring now to the attached drawings, the present invention will hereinafter be described in detail. Particularly, in the first embodiment, the present invention is applied to a recording and/or reproducing apparatus in which an audio signal is pulse-code-modulated (PCM) and recorded and/or reproduced by a video tape recorder (hereinafter referred to as VTR) using a magnetic tape 1-inch wide.

Figure 1:
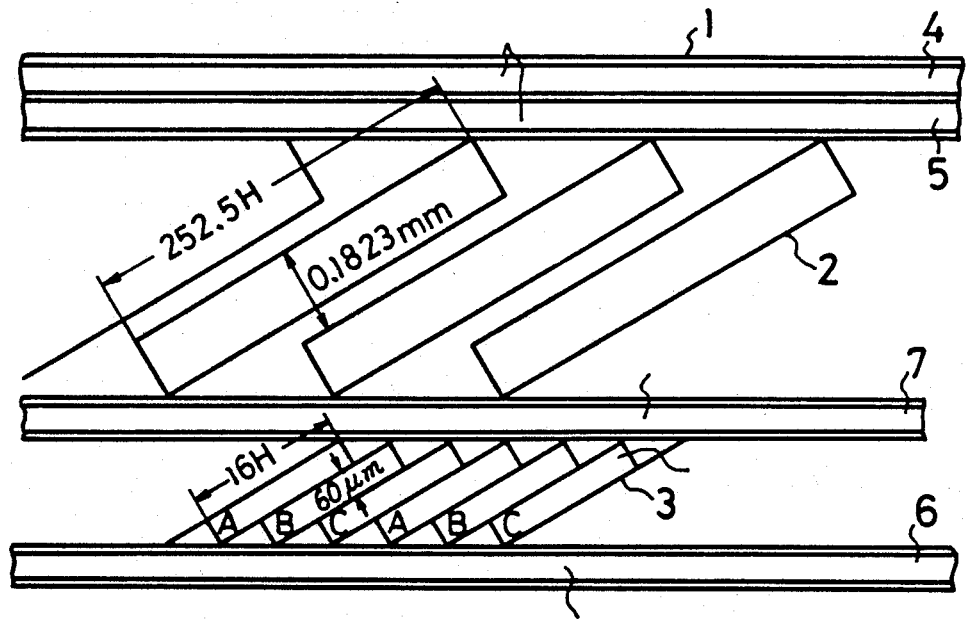
FIG. 1 is a schematic representation showing a track pattern formed on a magnetic tape according to the present invention.

In a VTR having 1 (or 1.5) rotary head using a magnetic tape 1-inch wide, that is, in a VTR having a so-called SMPTE-type C format, as shown in FIG. 1, a video track 2 on a magnetic tape 1 is formed with a pitch of, for example, 0.1823 mm and a PCM audio track 3 of about 60 μm wide is formed on a prior art synchronizing track by 3 tracks (A to C channels) per one pitch of the video track 2. The length of the PCM audio track 3 is about 16H (H is the horizontal scanning period of the NTSC system). In the case of the NTSC system, two channels (A and B channels) or all the three A to C channels are used, while in the case of the PAL system and SECAM system, the head scanning speed is relatively low so that three of A to C channels are all employed. Analog audio tracks 4 to 6 formed on the upper and lower side edges of the magnetic tape 1 by a fixed head and a CTL (control) track 7 formed under the video track 2 by a fixed head are formed with track patterns same as those in the prior art.

Figure 2A:
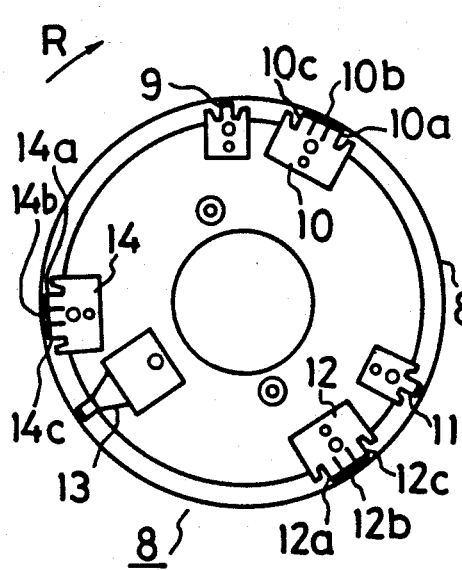
FIG. 2A is a plan view of a rotary head used in a first embodiment of this invention.

FIG. 2A is a plan view illustrating a first embodiment of a head drum 8 according to the present invention. Referring to FIG. 2A, to a peripheral surface of an upper drum 8U, there are mounted 12 heads including a video signal record/reproduce head 9, PCM audio signal record heads 10a to 10c of A to C channels, an erase head 11, PCM audio signal preceding reproduce heads 12a to 12c, a dynamic tracking head 13 for a special reproduction of a video signal and PCM audio signal monitor heads 14a to 14c along the rotation direction R of the head drum 8 with a predetermined angular distance, for example, an angular spacing of 30°.

The PCM audio signal record heads 10a to 10c, the preceding reading PCM audio signal reproduce heads 12a to 12c and the PCM audio signal monitor heads 14a to 14c are respectively mounted integrally on head bases 10, 12 and 14. In order to simultaneously reproduce the PCM audio track 3 of 3 channels A to C, the head chip of each channel has a step difference in the direction of the track width.

Figure 2B:
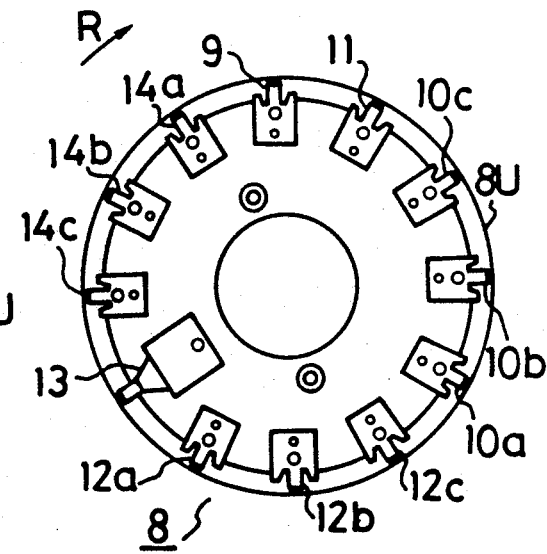
FIG. 2B is a plan view of a rotary head used in a second embodiment of this invention.

FIG. 2B is a plan view illustrating a second embodiment of the head drum 8 according to the present invention. As illustrated in FIG. 2B, the PCM audio signal record heads 10a to 10c, the preceding reading PCM signal reproduce heads 12a to 12c and the PCM audio signal monitor heads 14a to 14c, which are each integrally mounted on the head bases 10, 12 and 14 respectively in the example shown in FIG. 2A, are separately located with a predetermined angular spacing along the rotation direction R of the upper drum 8U. The length of the PCM audio track 3 shown in the track pattern of FIG. 1 is about 1/18 of the whole periphery of the head drum 8 and corresponds to about 20° in a rotation angle of the rotary head drum. Each spacing of the respective heads 10a to 10c; 12a to 12c; and 14a to 14c is selected to be more than 20° (about 30° in the embodiments of the invention). In addition, in order to form parallel slant tracks of 3 channels, they are arranged to have small step differences of heights a, b and c (in the track width direction).

According to this arrangement, when the parallel slant tracks of the A to C channels are formed, the respective heads 10a to 10c, 12a to 12c and 14a to 14c are prevented from simultaneously (in an overlapping fashion) scanning the PCM audio track 3 from a time standpoint so that the signal processing system (recording and/or reproducing circuit) can be formed as one channel and carries out the time division operation (serial processing).

The preceding recording PCM audio signal reproduce heads 12a to 12c are used to reproduce the PCM audio signal at the timing preceding (preceding, for example, by 3½ tracks) upon an edition so as to make the replacing operation of the audio signal easy. The PCM audio signal monitor heads 14a to 14c are used in the simultaneous recording and reproducing and referred to as a confidential head.

Figure 3:
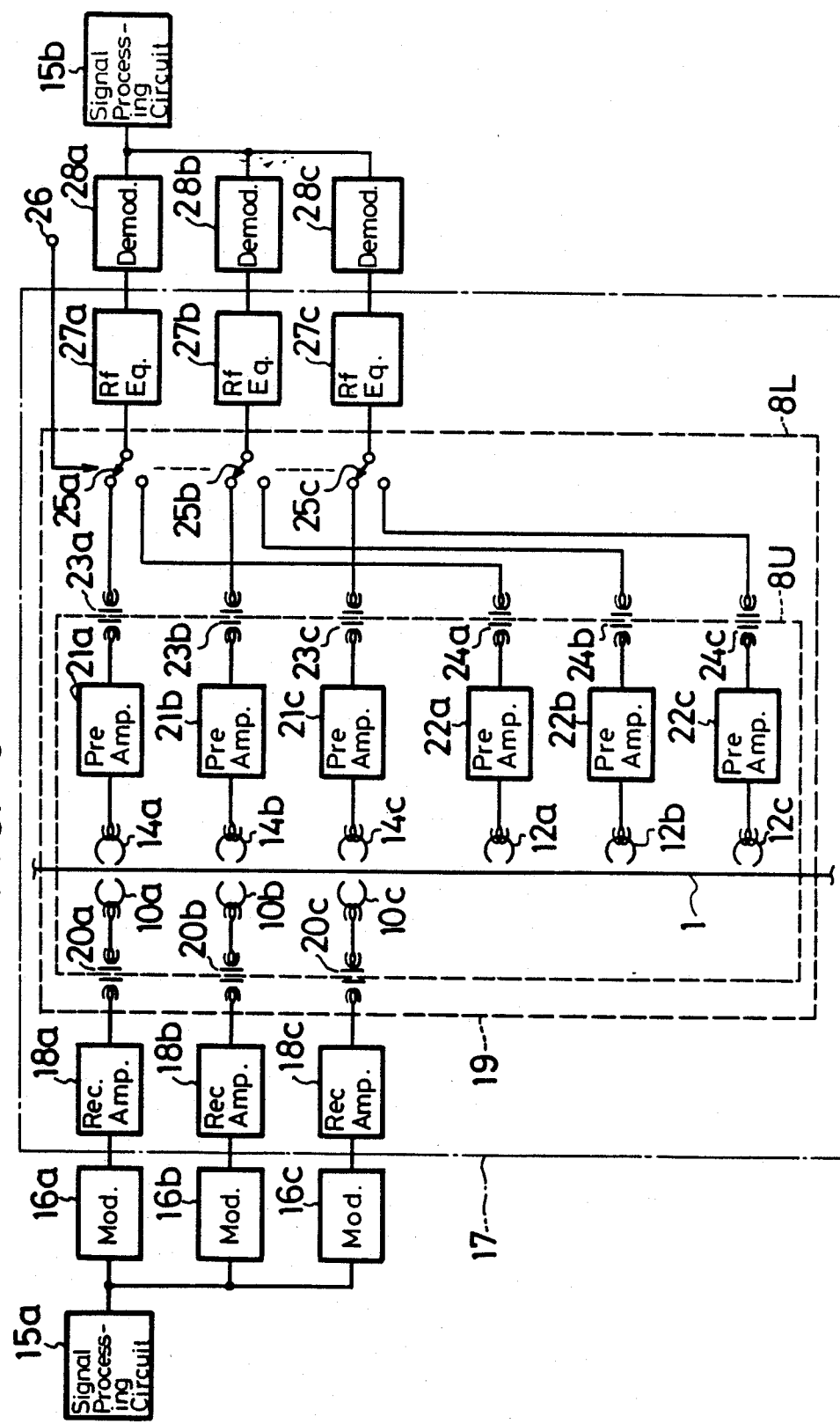
FIG. 3 is a schematic block diagram showing a recording and/or reproducing system in which the rotary head of the first embodiment is used.
Figure 4:
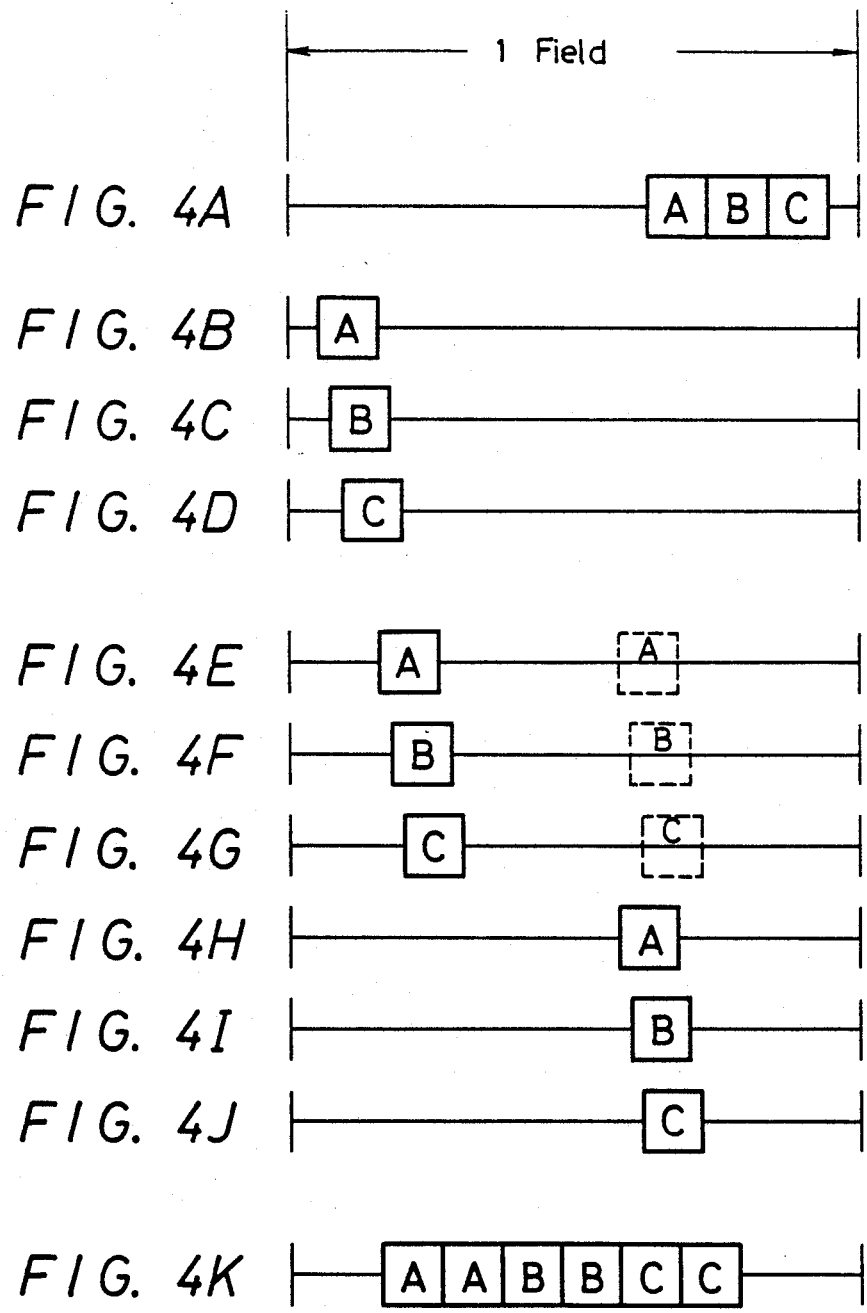
FIGS. 4A to 4K are timing charts respectively used to explain the operation of the embodiment of the invention shown in FIG. 3.

FIG. 3 is a block diagram of a PCM audio signal record and/or reproduce system used in a case where the head drum shown in FIG. 2A is used. Referring to FIG. 3, serial channel data A to C derived from an audio data signal processor 15a during one field period as shown by a timing chart in FIG. 4A in the recording side are converted in code and modulated by modulators 16a to 16c, which are provided for each channel, and then introduced into a VTR unit 17 as parallel and simultaneous data as shown in FIGS. 4B to 4D. The parallel data are supplied through recording amplifiers 18a to 18c and through rotary transformers 20a to 20c of a rotary head unit 19 to the recording heads 10a to 10c Reproduced signals are derived from the monitor heads 14a to 14c or the preceding PCM audio signal reproduce heads 12a to 12c at the timings shown in FIGS. 4E to 4G or FIGS. 4H to 4J. These reproduced signals are amplified by pre-amplifiers 21a to 21c and 22a to 22c and fed through 6-channel rotary transformers 23a to 23c and 24a to 24c to change-over switches 25a to 25c which are controlled in response to a switching signal applied thereto from an input terminal 26. The reproduced signals, which are changed-over to the 3-channel reproduced signals by the change-over switches 25a to 25c, are supplied through RF equalizers 27a to 27c to demodulators 28a to 28c in which they are converted to a serial signal shown in FIG. 4K. This serial signal is fed to a signal processing circuit 15b.

Figure 5:
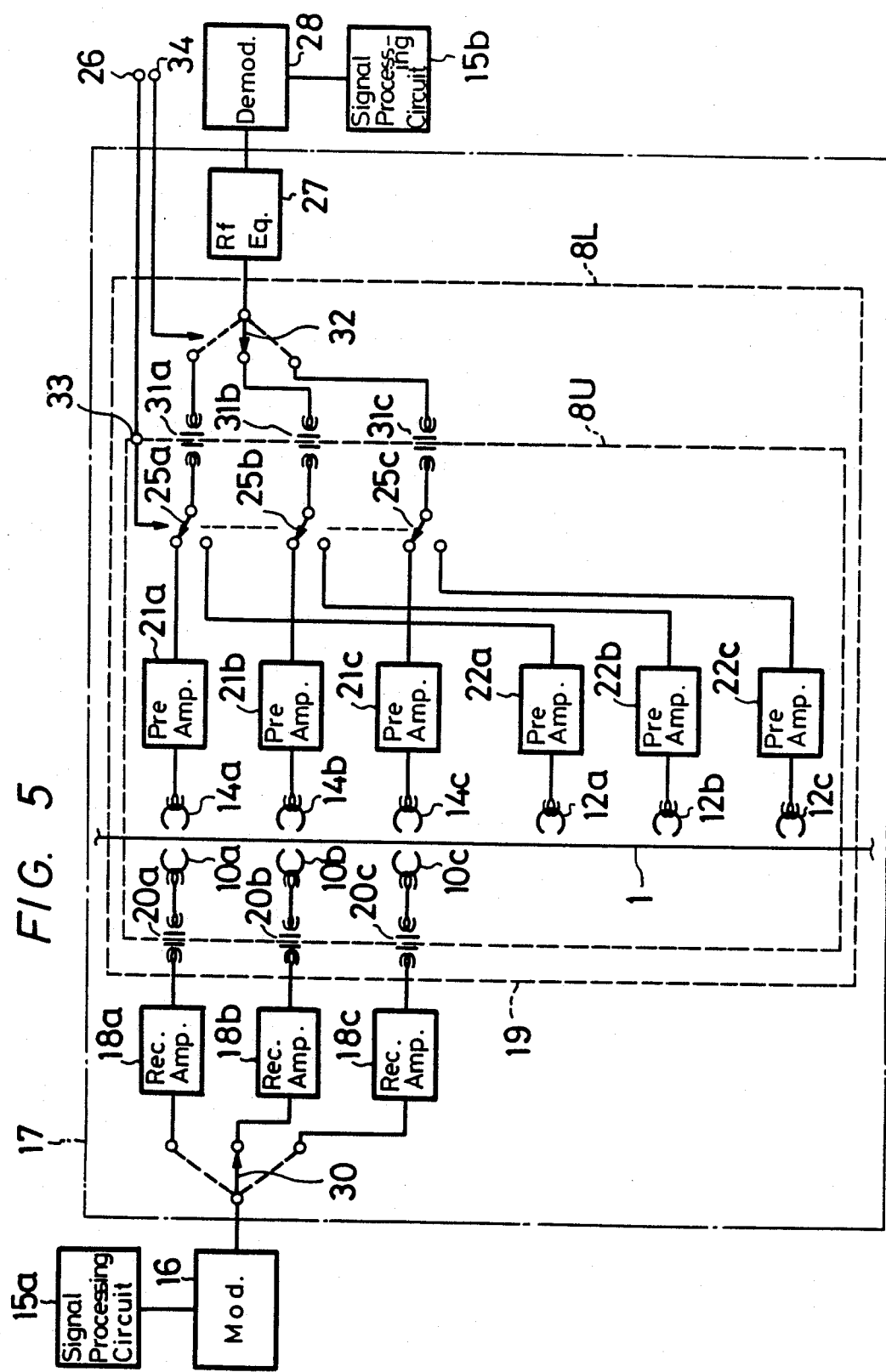
FIG. 5 is a schematic block diagram showing a recording and/or reproducing system in which the rotary head of the second embodiment is used.
Figure 6M:
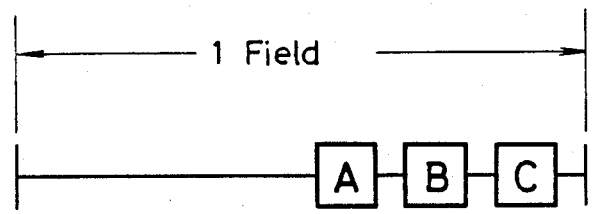
FIGS. 6A to 6M are timing charts respectively used to explain the operation of the embodiment of the invention shown in FIG. 5.
Figure 6A:
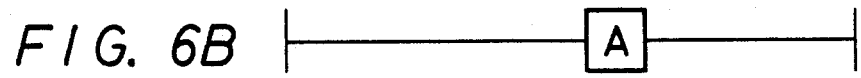
Figure 6B:
Figure 6C:
Figure 6D:
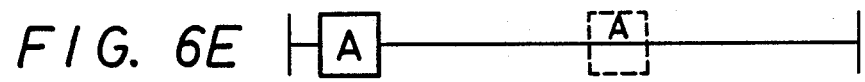

FIG. 5 is a block diagram of a PCM audio signal recording and/or reproducing system using the head drum shown in FIG. 2B. Referring to FIG. 5, in the recording system thereof, the serial audio output data A to C shown in a timing chart of FIG. 6A derived from the signal processing circuit 15a are processed by a single modulator 16 and then distributed to 3 channel signals by a distributing switch 30 as shown in FIGS. 6B to 6D. The three channel signals are supplied through the recording amplifiers 18a to 18c and the rotary transformers 20a to 20c to the recording heads 10a to 10c.

Figure 6E:
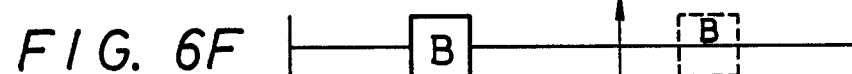
Figure 6F:
Figure 6G:
Figure 6H:
Figure 6I:
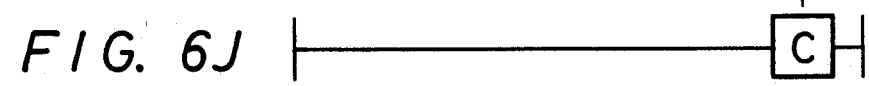
Figure 6J:
Figure 6K:
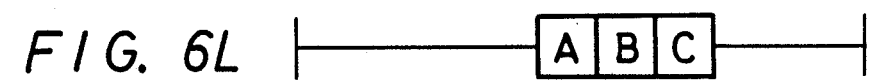
Figure 6L:

In the reproducing system., from the monitor heads 14a to 14c and the preceding reading reproduce heads 12a to 12c, there are derived reproduced signals A to C shown in FIGS. 6E to 6G and FIGS. 6H to 6J which are not overlapped from a time standpoint and then fed to playback amplifiers 21a to 21c and 22a to 22c. In this case, they are supplied thereto as follows. That is, at first, the signal on the track A is reproduced by the head 14a as shown in FIG. 6E, then the signal on the track B is reproduced by the head 14b as shown in FIG. 6F and next the signal on the track C is reproduced by the head 14c as shown in FIG. 6G. After the playback operations are carried out by the heads 14a, 14b and 14c, the signal on the track A is reproduced by the reproduce head 12a as shown in FIG. 6H, then the signal on the track B reproduced by the reproduce head 12b as shown in FIG. 6I and last, the signal on the track C is reproduced by the reproduce head 12c as shown in FIG. 6J. The reproduced signal by each head is obtained in a range of about 20° in a rotation angle of the upper drum 8U. The preceding read outputs or the monitor outputs are selected by the change-over switches 25a to 25c and supplied through rotary transformers 31a to 31c to a selection switch 32 in which they are sequentially selected and then converted to a serial data signal shown in FIG. 6K or 6L. The serial signals A to C are processed in a serial fashion by a single RF equalizer 27 and a demodulator 28 to be a serial signal shown in FIG. 6M, which is then inputted to the signal processing circuit 15b. In this case, the switching signal is supplied to the change-over switches 25a to 25c from the input terminal 26 through a slip ring 33 provided between the upper drum 8U and a lower drum 8L. A switching control signal is supplied to the change-over switch 32 from an input terminal 34. Since the reproduced signals obtained at the heads 14a, 14b and 14c are displaced in timing as shown in FIGS. 6E to 6G, the change-over switching circuit 32 is changed-over by the switching signal supplied thereto from the input terminal 34 such that its movable contact is sequentially connected to its fixed contacts connected to the rotary transformers 31a, 31b and 31c during the period in which each reproduced signal is obtained. Thus, within one field period, the signals on the tracks A, B and C are reproduced through the RF equalizer 27 as shown in FIG. 6K. The reproduced signals obtained from the heads 14a, 14b and 14c as described above are used for monitoring in the recording mode. Since the reproduce signals obtained from the respective heads 12a, 12b and 12c are displaced as shown in FIGS. 6H, 6I and 6J, similarly to the playback operations of the heads 14a, 14b and 14c, the movable contact of the change-over switch 32 is changed-over at every reproducing period, whereby to reproduce the signals of the respective channels A, B and C through the equalizer 27 within one field period after the playback period of the above mentioned heads 14a to 14c as shown in FIG. 6L. The reproduced signals thus obtained from the reproduce heads 12a, 12b and 12c are supplied to the reproducing circuit system of the apparatus.

When the reproduced signals obtained by the heads 14a, 14b and 14c and the reproduced signals obtained by the heads 12a, 12b and 12c are all reproduced, after the playback period in which the signals are reproduced by the heads 14a, 14b and 14c are ended, the movable contacts of the change-over switches 25a, 25b and 25c are switchably changed in position from the fixed contacts at the sides of the playback amplifiers 21a, 21b and 21c to the fixed contacts at the sides of the playback amplifiers 22a, 22b and 22c. When the movable contacts of the switches 25a, 25b and 25c are changed in position as mentioned above, all the signals reproduced by the heads 14a, 14b and 14c and the reproduce heads 12a, 12b and 12c are obtained as shown in FIG. 6M. The reproduced signals thus obtained are supplied to the reproducing circuit system and the like and thereby processed properly.

Since the multi-channel signals, which are originally recorded in the parallel PCM audio tracks 3, are processed in a serial fashion, the circuit arrangement of the record and/or reproduce circuit can be simplified considerably.

Alternatively, the recording amplifiers 18a to 18c are formed into a single recording amplifier and at the next state the signals may be distributed into the heads of 3 channels. Further, if a head change-over switch (used to branch one channel into 3 channels) is provided within the upper drum 8U (rotary drum), the rotary transformers 20a to 20c can be formed into a single rotary transformer to thereby transmit the signal via one transmission channel in a time division manner. Similarly in the reproducing system, a head change-over switch for converting 3 channels into 1 channel is provided within the upper drum 8U to thereby integrate the transmission lines of the reproduced signals into one transmission line and the rotary transformers can be formed into the rotary transformer of one channel (2 circuits for recording and reproducing modes). Furthermore, if the record and/or reproduce head is used, it is sufficient that the rotary transformer be provided for one circuit.

According to the present invention as set forth above, when a plurality of PCM audio tracks are formed by every one rotation of the head drum and recorded and/or reproduced, a plurality of rotary heads scan the tracks without overlapping in timing and the record and/or reproduce circuit processes the serial signal so that the circuit arrangement can be simplified, the manufacturing cost can be reduced and the reliability can be improved.

In the circuit arrangement shown in FIG. 5, the upper drum 8U and the lower drum 8L are connected through the three rotary transformers 31a, 31b and 31c which supplies the reproduced signals and the slip ring 33 through which the switching signal is supplied. In addition, including the rotary transformers used to connect the audio signal recording head and the video signal record and/or reproduce head, the number of the rotary transformers provided between the upper drum 8U and the lower drum 8L is increased substantially. Thus, a large space must be used to provide the rotary transformers and hence the rotary head drum assembly becomes large in size.

Figure 7:
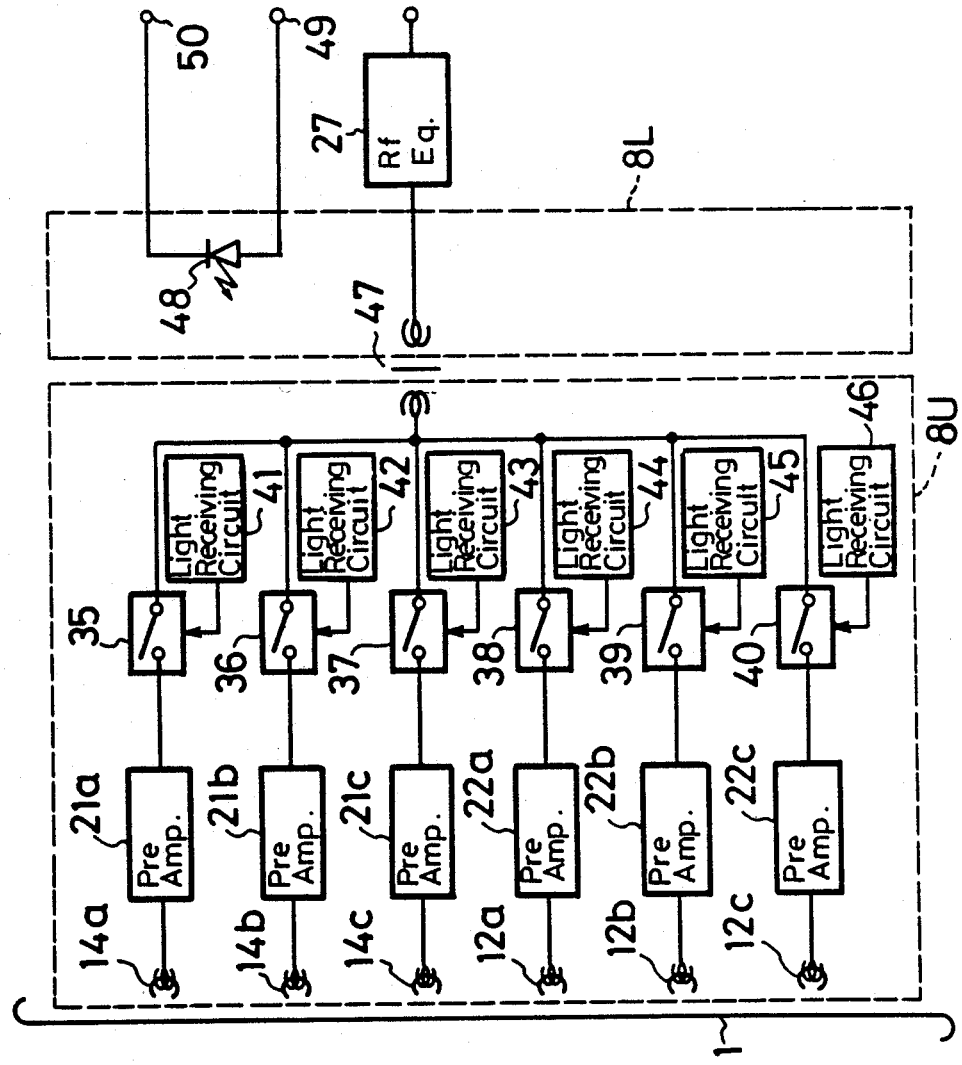
FIG. 7 is a block diagram showing a reproducing system of a third embodiment of the invention.

FIG. 7 is a schematic block diagram showing a third embodiment of the present invention which can overcome the above mentioned defects. In FIG. 7, like parts corresponding to those of FIG. 5 are marked with the same references and will not be described. Referring to FIG. 7, the reproduced signals from the heads 14a, 14b and 14c and the reproduce heads 12a, 12b and 12c provided within the upper drum 8U are supplied through the amplifiers 21a, 21b and 21c and 22a, 22b, 22c to respective first terminals of switches 35 to 40. When the switches 35 to 40 are closed, the reproduced signals obtained at the other terminals thereof are supplied to the side of the upper drum 8U of a single rotary transformer 47. The switches 35 to 40 are turned on and off by light receiving circuits 41 to 46 which will be described later. The reproduced signal obtained t the side of the lower drum 8L of the rotary transformer 47 is supplied to the playback equalizer 27. In the lower drum 8L, a light emission diode 48 is connected between a control signal input terminal 49 and a control signal output terminal 50 and the light emission diode 48 is arranged to always emit a light during the playback mode.

Figure 8:
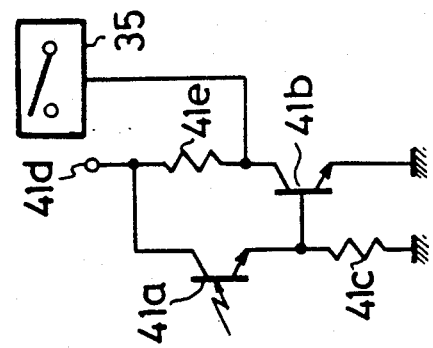
FIG. 8 is a circuit diagram showing an embodiment of a light receiving circuit shown in FIG. 7.

Subsequently, the circuit arrangements of the light receiving circuits 41 to 46 which control the switches 35 to 40 will be described with reference to FIG. 8. In this case, the light receiving circuit 41 will be described by way of example. In the light receiving circuit 41, an emitter of a photo transistor 41a is connected to the base of an NPN transistor 41b and grounded via a resistor 41c. The collector of the photo transistor 41a is connected to a drive signal input terminal 41d. Further, the emitter of the transistor 41b is grounded and the collector thereof is connected through a resistor 41e to the drive signal input terminal 41d and directly to the switch 35. With the circuit arrangement thus made, when the photo transistor 41a receives a light, this photo transistor 41a is turned on. When this photo transistor 41a is turned on, the transistor 41b is also turned on so that the signal from the drive signal input terminal 41d is supplied to the switch 35, placing the switch 35 in its closed state. When the photo transistor 41a does not receive the light, the photo transistor 41a and the transistor 41b are not turned on so that no signal is supplied to the switch 35, thus the switch 35 being placed in the open state. Other light receiving circuits 42 to 46 are constructed similarly.

Figure 9A:
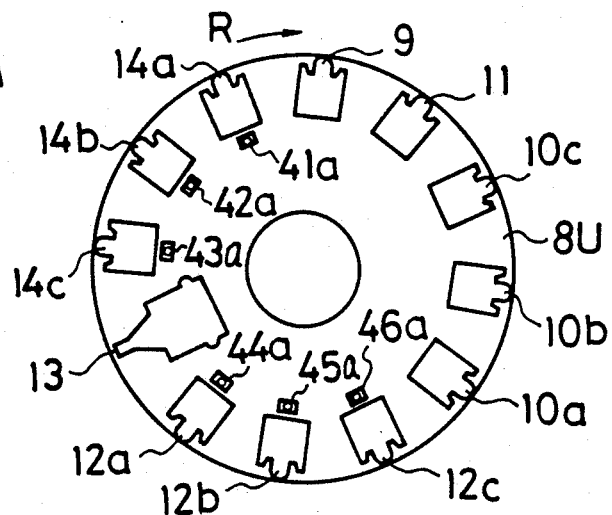
FIGS. 9A to 9C are schematic diagrams respectively showing a rotary head used in the third embodiment shown in FIG. 7.
Figure 9B:
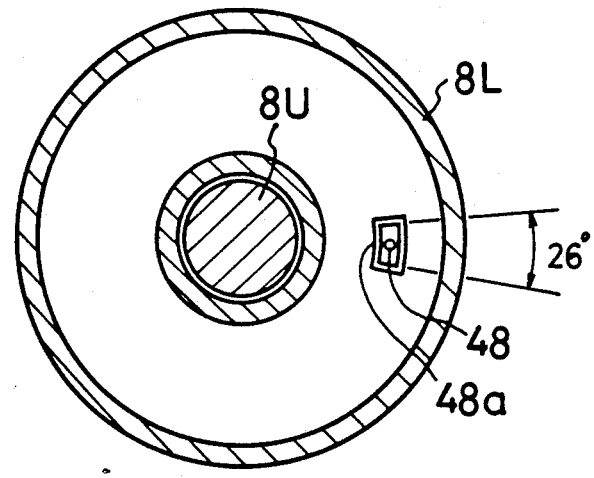
Figure 9C:
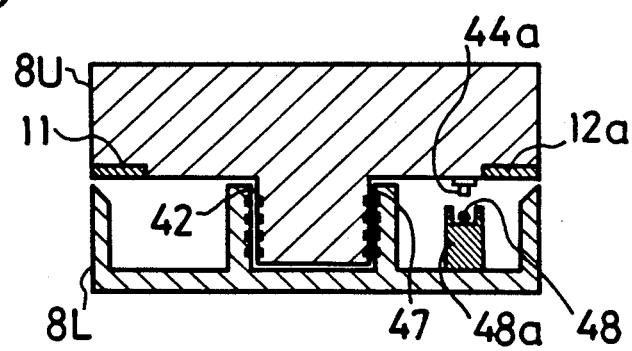

The arrangements of the respective members on the rotary head drum will be described below with reference to FIGS. 9A to 9C. The respective magnetic heads 9 to 14c are mounted on the upper drum 8U with an equal angular spacing (at every 30°) as illustrated in FIG. 9A, similarly to the example shown in FIG. 2B. Referring to FIG. 9A, just after the heads 14a, 14b and 14c and the digital audio signal reproduce heads 12a, 12b and 12c, there are provided the photo transistors 41a to 46a of the respective light receiving circuits 41 to 46 and the respective light receiving sections of the photo transistors 41a to 46a are opposed to the lower drum 8L. The light emission diode 48 is mounted on the lower drum 8L such that as shown in FIGS. 9B and 9C, the light emission diode 48 is secured within a housing 48a whose open end is faced to the upper drum 8U by, for example, a rotation angle of 26°. Thus, it becomes possible to obtain a rotation angle of 23° which is required in the playback.

With this arrangement, when the digital audio signal is reproduced, the photo transistors 41a to 46a mounted on the upper drum 8U sequentially move over the light emission diode 48 mounted on the lower drum 8L. While the photo transistors 41a to 46a receive the light emitted from the light emission diode 48, the switches 35 to 40 connected to the photo transistors 41a to 46a are closed. Since the light emission diode 48 is housed in the housing 48a so as to transmit the light to the upper drum 8U through a range of 26° in a rotation angle of the head drum and the respective heads are mounted on the upper drum 8U with the angular spacing of 30°, only one of the photo transistors 41a to 46a can receive the light emitted from the light emission diode 48 or none of them can receive it. On the other hand, the digital audio signals are reproduced by the heads 14a, 14b and 14c and the reproduce heads 12a, 12b and 12c in such a way that they are displaced in timing by the predetermined interval as shown in FIG. 6. In addition, the reproduced signals by the respective heads are obtained in a range of 23° in a rotation angle of the head drum. Accordingly, if the respective heads 14a to 14c and 12a to 12c are positioned so that the angular range of 23° in which the reproduced signals of the respective heads are obtained falls within the angular spacing of 26° in which the photo transistors 41a to 46a receive the light emitted from the light emission diode 48, the switches 35 to 40 are respectively closed by the light emitted from the light emission diode 48 during the period in which the reproduced signals of the respective heads are obtained. When the switches 35 to 40 are closed as described above, the reproduced signals from the respective heads 14a to 14c and 12a to 12c are sequentially obtained at the side of the upper drum 8U of the rotary transformer 47 as shown in FIG. 6M. The reproduce signals are supplied through the side of the lower drum 8L of the rotary transformer 47 to the playback equalizer 27.

According to this embodiment, since the reproduced signal is supplied through one rotary transformer 47 to the side of the lower drum 8L from the side of the upper drum 8U and the switches 35 to 40 are controlled so as to open and close by the light emission diode 48 provided on the lower drum 8L, it is not necessary to supply the signal used to control the switches 35 to 40 by using the rotary transformer, the slip ring and the like. Thus, the number of the rotary transformers and the slip ring between the upper drum 8U and the lower drum 8L can be reduced considerably as compared with the prior art. Therefore, the rotary head assembly can be miniaturized and simplified in construction. Further, the drive signals supplied to the light receiving circuits 41 to 46 can be used commonly as the drive signals which drive the amplifiers 21a to 21c and 22a to 22c. Thus, the number of the signal supply lines between the upper drum 8U and the lower drum 8L can be prevented from being increased.

By the way, when the signal is recorded and/or reproduced in a digital fashion, a time delay occurs in the signal due to an A/D (analog-to-digital) conversion, a D/A (digital-to-analog) conversion, an error correction and the like upon recording and reproducing. When the signal is processed at the unit of one field period, this time delay becomes one field period in the case of the recording mode, while it becomes more than one field period due to the error correction and the like in the case of the reproducing mode. For this reason, in the afore-mentioned recording apparatus, the record heads and the reproduce heads are provided independently and the reproduce heads are located to precede the record head in position by the amount corresponding to this time delay so that the timing at which the PCM audio signal is reproduced can coincide with the timing in the recording mode.

An example of the signal processing circuit 15 of the recording and/or reproducing apparatus according to the present invention will be described with reference to FIG. 10.

Figure 10:
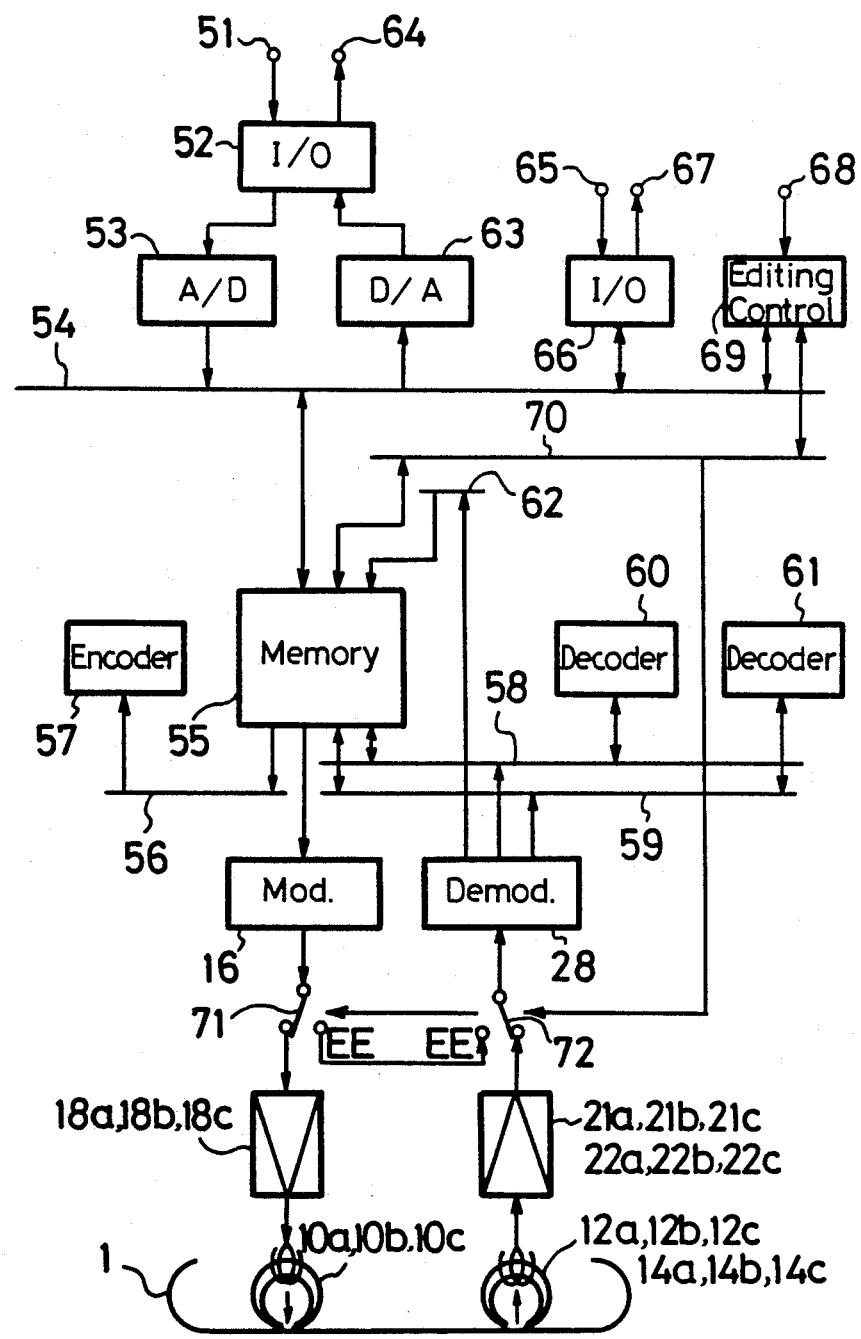
FIG. 10 is a block diagram showing an embodiment of a signal processing circuit according to the present invention.

Referring to FIG. 10, an analog audio signal applied to an input terminal 51 is supplied through an I/O (input and output) circuit 52 to an A/D converter 53 and thereby converted to a digitial data. This digital data is supplied to a data bus 54 and the data on the data bus 54 is supplied to a memory 55 in which it is stored.

Further, the data stored in the memory 55 is supplied through a data bus 56 to an encoder 57 and thereby encoded: a predetermined error correction code is added, the data is re-arranged and so on. The data from the memory 55 is also supplied to the modulator 16 and thereby modulated. The PCM audio data formed by the modulated data is supplied through the recording amplifiers 18a, 18b and 18c and the rotary transformers 20a, 20b and 20c (shown in FIG. 3 but not shown in FIG. 10 for simplicity of drawing) to the recording heads 10a, 10b and 10c and thereby recorded on the slant tracks having the narrow width and corresponding to the synchronizing signal track on the above mentioned magnetic tape 1. Further in the reproducing mode, the signals reproduced from the magnetic tape 1 by the reproduce heads 12a, 12b and 12c or the heads 14a, 14b and 14c are supplied through the playback amplifiers 21a, 21b and 21c or 22a, 22b and 22c to the demodulator 28 in which the recorded digital data is demodulated. The demodulated data is supplied to data buses 58 and 59 and the data on the data buses 58 and 59 are supplied to the memory 55 and also to first and second decoders 60 and 61. The address of the data detected by the demodulator 28 is supplied through an address bus 62 to the memory 55.

Then, the data as decoded (re-arranged, error-corrected and so on) is supplied from the memory 55 to the data bus 54. The data on the data bus 54 is supplied to a D/A converter 63 and thereby converted to an analog audio signal. This analog audio signal is supplied through the I/O circuit 52 to an output terminal 64.

A signal applied to an input terminal 65 for a digital signal is supplied through an I/O circuit 66 to the data bus 54, while the signal on the data bus 54 is supplied through the I/O circuit 66 to a digital signal output terminal 67.

Figures 11A, 11B:
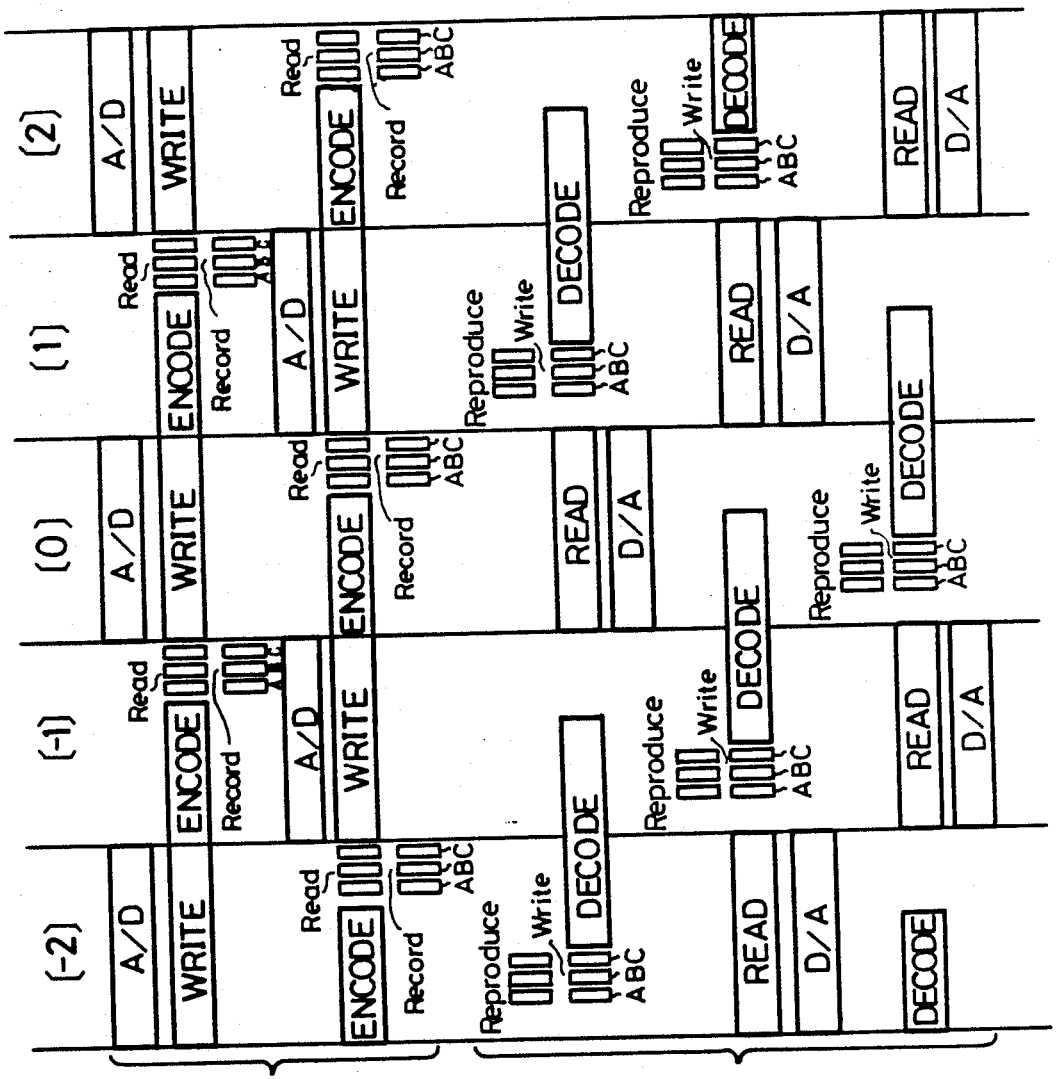
FIGS. 11A to 11C (they are separately formed for convenience sake of sheet of drawing) are timing charts respectively used to explain the recording and/or reproducing operation of the apparatus according to the present invention.
Figure 11C:
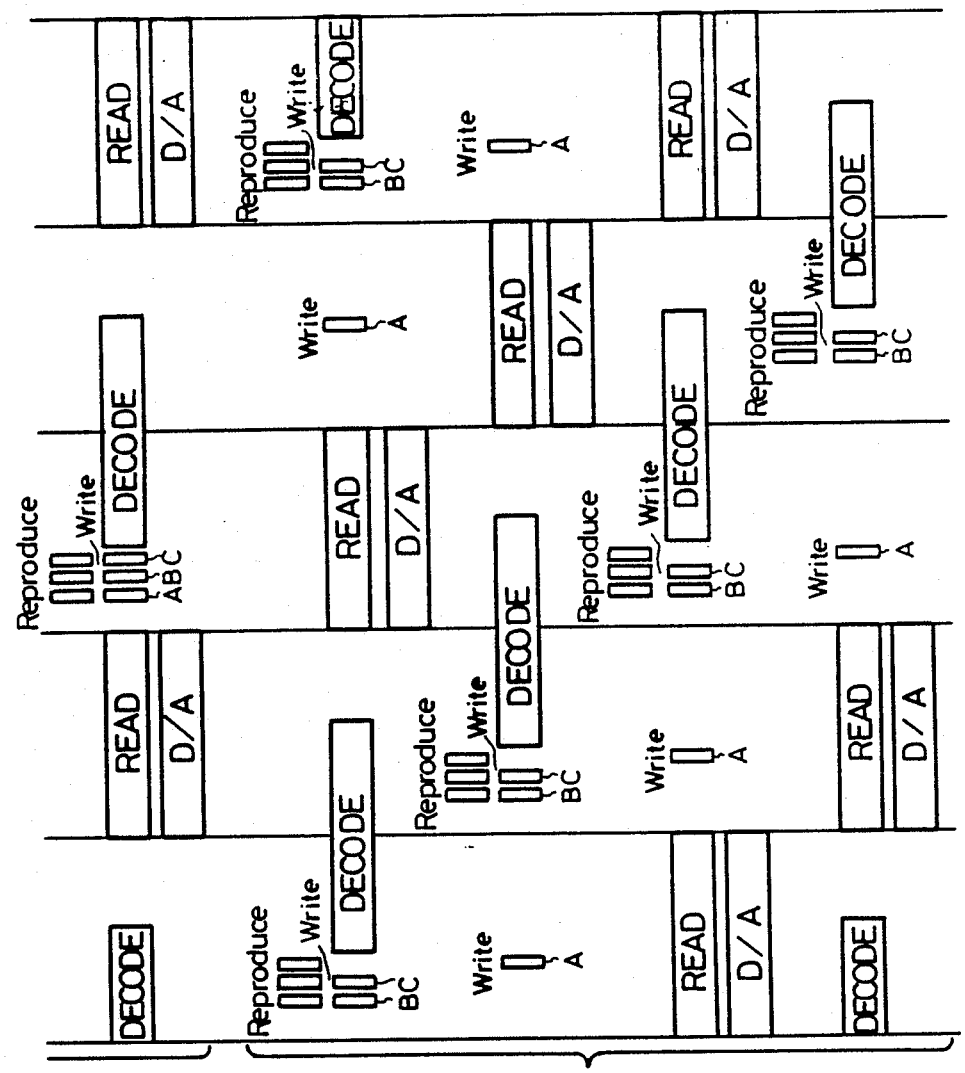

FIGS. 11A to 11C (drawn on two sheets for convenience) are respectively timing charts used to explain the recording and reproducing operation of the apparatus shown. Throughout FIGS. 11A to 11C, vertical lines indicate the border lines between the adjacent fields. FIG. 11A shows the recording operation of the apparatus. Referring to FIG. 11A, the signal A/D-converted during, for example, a field "0" is encoded during the first half of a next field "1", time-base-compressed and read out during the second half of this field "1" and then recorded by the record heads 10a, 10b and 10c. On the other hand, FIG. 11B illustrates the normal reproducing operation. Referring to FIG. 11B, the signals reproduced by the reproduce heads 12a, 12b and 12c at the former half of, for example, a field "−2" are decoded over the period from the latter half of the field "−2" to the former half of a next field "−1", time-base-expanded during the period of the next field "0", then D/A-converted and then delivered.

Accordingly, in the above mentioned apparatus, when the signals are derived during the same field "0", the reproduce heads 12a, 12b and 12c must to precede the record heads 10a, 10b and 10c by the amount of more than 3 field periods. Then, in the case of the above mentioned apparatus, since the mounting positions of the reproduce heads 12a, 12b and 12c on the rotary drum precede those of the record heads 10a, 10b and 10c by 90° in a rotation angle of the head drum, the practical preceding amount is 3¼ fields.

However, in that case, according to the video tape recorder using the so-called SMPTE type C format, in addition to the inherent head 9 used to generally record and/or reproduce the video signal, there is provided a dynamic tracking (hereinafter simply referred to as DT) head 13 which is used to reproduce the video signal in the playback mode with variable tape speeds. This DT head 13 is mounted on the rotary drum at the position after the inherent record and/or reproduce head 9 by 120° in a rotation angle of the head drum. When the signal is reproduced by the DT head 13 which is mounted with an angular spacing different from that of the inherent head 9, the magnetic tape 1 is transported under the state that it precedes the normal position by the ⅓ track pitch so that the tracking of the PCM audio signal recorded on the above mentioned synchronizing track is displaced and thus the satisfactory playback can not be carried out.

To avoid this defect, it may be considered that another set of reproduce heads for the PCM audio signal be provided at an angle matched with 120°. However, if there are provided many heads, the construction of the rotary drum becomes complicated and the signal processing system becomes also complicated in circuit arrangement.

In that case, however, the tracks A, B and C of the PCM signal are located at every ⅓ track pitch as described above so that even when the magnetic tape 1 is transported under the state that it precedes by ⅓ track pitch amount, the tracks A, B and C can be reproduced equivalently by the heads 12a, 12b and 12c. In this case, however, since the head precedes 12a to 12c by the ⅓ track pitch, the PCM signals reproduced at the timing same as the normal timing are reproduced from, for example, the tracks B, C and the track A of the next field.

Then, as shown in the timing chart in FIG. 11C, the signal of the track A reproduced during the period of, for example, the field "−2" is kept over the next field "−1" and decoded together with signals of the tracks B and C reproduced during the next field "−1". Therefore, in order to carry out the reproducing at the variable tape speed by using the DT head 13 as shown in FIG. 10, the control signal is supplied through a terminal 68 to an edition control circuit 69 and the control signal from the edition control circuit 69 is supplied through an auxiliary bus line 70 to the memory 55. In other words, in order to control the memory 55 as above, the control signal applied to the terminal 68 is supplied through the edition control circuit 69 to the memory 55.

According to the apparatus as described above, when the dynamic tracking head 13 is used, the same reproduce head can be used to reproduce the PCM signal so that the PCM signal can be recorded and/or reproduced by the simple arrangement.

In this case, the capacity of the memory 55 requires one field amount more when the signal is reproduced by using the dynamic tracking head 13.

In addition, the head arrangement on the rotary drum is not limited to the above mentioned example.

By the way, when the digital audio signal is dubbed with the same sampling frequency, there is caused no trouble. However, when the signal is dubbed in the mode of different sampling frequencies, for example, the signal is dubbed from the playback side having a frequency of, for example, 48 kHz to the recording side having a frequency of 44.056 kHz or when the digital signal is signal-processed via a transversal filter such as a sampling rate converter and the like, there will occur the time delay of one to several sampling periods. However, the normal signal processing is carried out at the unit of, for example, one field period as described above so that there is a fear that the recording after the edition will be obstructed from being carried out normally even when the delay amount is very small.

Although as described above the reproduce heads 12a, 12b and 12c are located to precede the record heads by the amount of more than 3 field periods, one field period for the A/D-conversion and the D/A-conversion and one field period for the encoding upon recording and the recording are required in practice but with respect to 1¼ field periods for the reproducing and the decoding (error correction) in the playback mode, about one field is required in practice, so that the remaining field of about ¼ is an extra field. For this reason, in the above mentioned timing charts, during the period of about ¼ field from the end of the decoding to the start of the D/A-conversion, the digital data is kept in the memory 55 only and placed in the stop mode.

Accordingly, when the data is signal-processed in the above mentioned edition mode and the like, the data is read out of the memory 55 at an earlier timing by the amount necessary to the processing and thereby the time delay caused by the signal processing can be removed. Specifically, referring to the above mentioned block diagram of FIG. 10, the reading of the data from the memory 55 is controlled by the control signal from the edition control circuit 69, so that in the normal playback mode, the data is read out from the beginning of the next field, while upon edition, the data is read at a time point preceding the beginning of the next field.

Thus, the signal-processing operation which causes the time delay can be carried out without any time delay.

In this case, the reading operation from the memory 55 can be delayed until the end point of one field period approaches immediately before the playback of the next field. Consequently, it becomes possible to remove a defect that the video signal is delayed when the video signal, for example, is signal-processed.

Figure 12A:
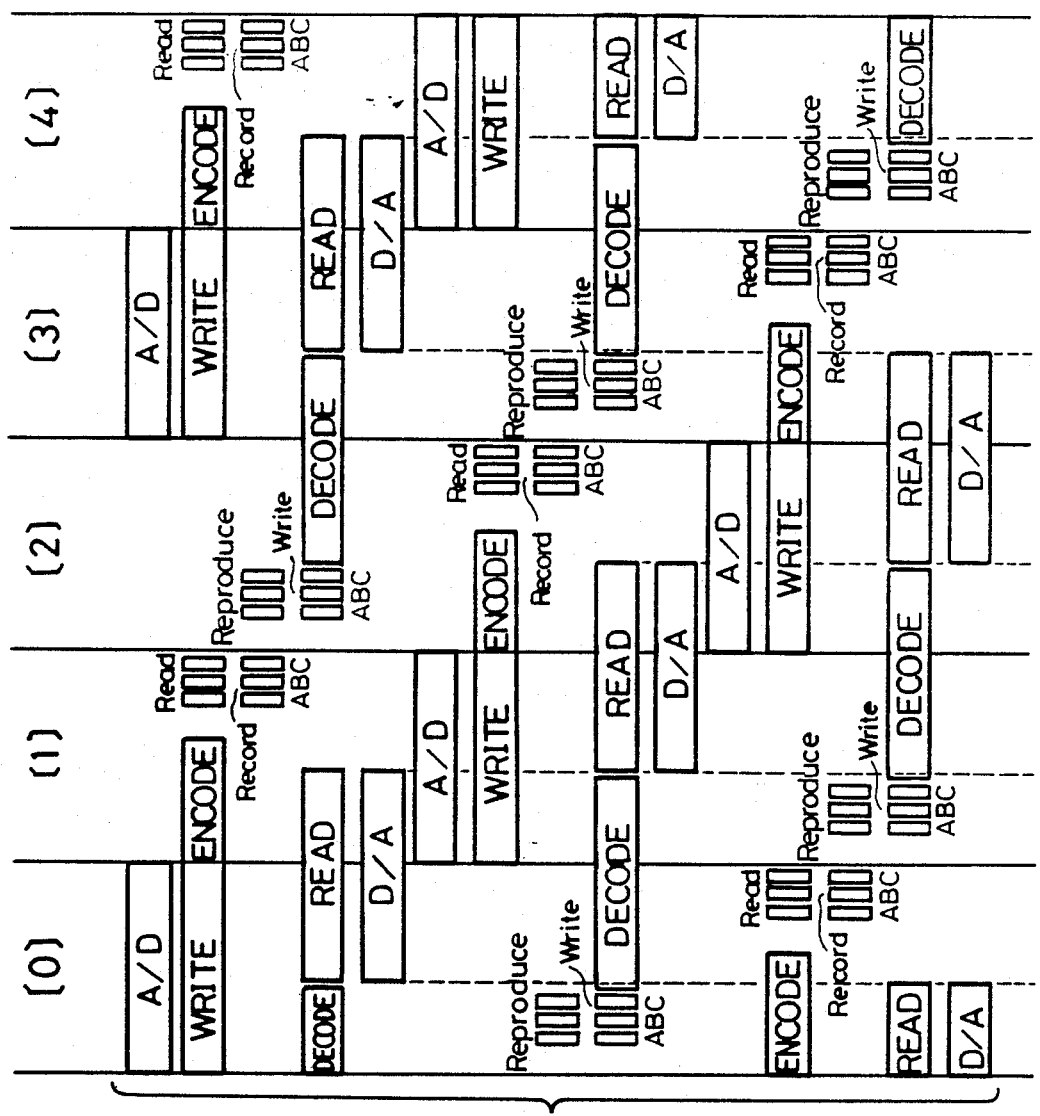
FIGS. 12A and 12B (they are separately formed for convenience sake of sheet of drawings) are timing charts respectively used to explain a monitor playback operation and an operation in an EE (electronic edition) mode.

FIG. 12A is a timing chart used to explain the monitor playback mode of the apparatus. Referring to FIG. 12A, a signal A/D-converted during the period of, for example, the field "0" is encoded in the first half of the next field "1", time-base-compressed and read in the second half of this period of the field "1" and then recorded by the record heads 10a, 10b and 10c. The signal thus recorded is reproduced by the monitor playback heads 14a, 14b and 14c during the first half of the next field "2". The signal reproduced is decoded over the period from the second half of the field "2" to the first half of the next field "3", time-base-expanded and read out during the period corresponding to the succeeding one field and then D/A-converted. In other words, in the monitor playback mode, it is not necessary that the audio signal be synchronized with the video signal so that the reading and the D/A conversion can be carried out immediately.

Further, another mode in which the signal just before being supplied to the record heads 10a, 10b and 10c is demodulated and then monitored, that is, so-called EE (electronic edition) mode will be described with reference to the block diagram of FIG. 10. In order to realize the above mode, there are respectively provided change-over switches 71 and 72 between the modulator 16 and the recording amplifiers 18a, 18b and 18c and between the demodulator 28 and the playback amplifiers 21a, 21b, 21c and 22a, 22b, 22c. The modulator 16 and the demodulator 28 are connected to the movable contact of the change-over switches 71 and 72, respectively, while the recording amplifiers 18a, 18b and 18c and the playback amplifiers 21a, 21b, 21c and 22a, 22b, 22c are connected to one fixed contacts thereof. The other fixed contacts of the switches 71 and 72 are coupled together. The change-over switches 71 and 72 are changed in position to the other fixed contacts by the control signal from the edition control circuit 69 in the EE mode.

Figure 12B:
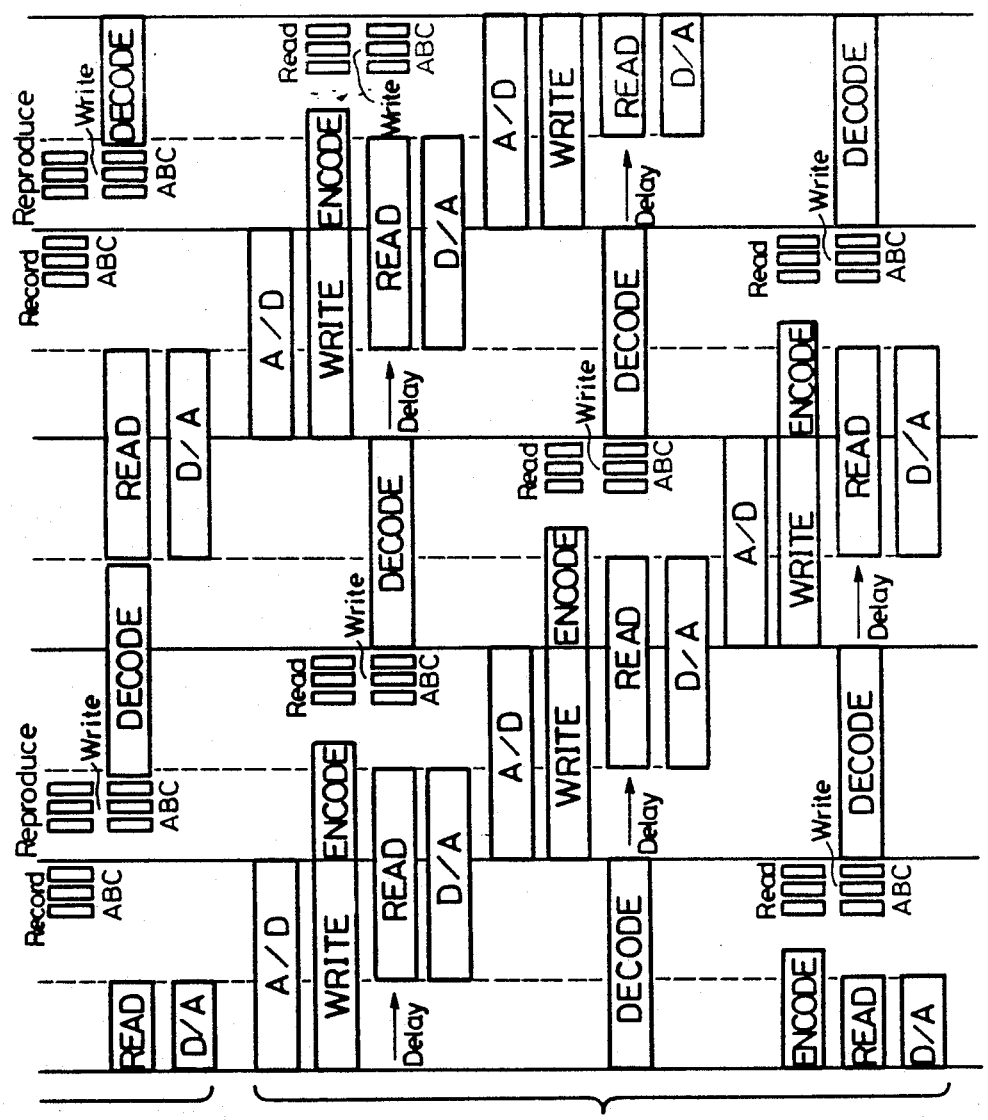

FIG. 12B is a timing chart used to explain the operation of the apparatus in the EE mode. Referring to FIG. 12B, a signal A/D-converted during the first half of, for example, the field "0" is encoded during the first half of the next field "1", time-base-compressed during the second half of this field "1" and then read out. The signal thus read out is supplied to the modulator 16 and further supplied through the change-over switches 71 and 72 to the demodulator 28. The demodulated signal is written again in the memory 55 and then decoded during the period of the next field "2". The signal thus decoded is time-base-expanded and then read out during the period corresponding to the succeeding one field and then D/A-converted. In this case, the reading operation of the data from the memory 55 is controlled so that the timings of the reading and the D/A-conversion may coincide with each other.

In consequence, by the monitor reproduced signal and the reproduced signal in the EE mode, the timing displacement relative to the EE mode and caused in response to the distance from the record heads 10a, 10b and 10c to the monitor reproduce heads 14a, 14b and 14c can be compensated for. Thus, the monitor playback operation and the operation in the EE mode can be carried out by the simple circuit arrangement. Further, the comparison can be carried out satisfactorily under the state that the time points of these signals are made coincident with each other.

In this case, the capacity of the memory 55 must be increased by the amount of one field period for the purpose of carrying out the operations in the monitor playback mode and the EE mode.

In addition, the present invention is not limited to the above mentioned apparatus but can be applied to various apparatus for recording and/or reproducing an audio signal, particularly, a PCM audio signal by using a rotary head, an apparatus such as a digital VTR for recording and/or reproducing a video signal and an audio signal and so on.

The above description is given on the preferred embodiments of the invention but it will be apparent that many modifications and variation could be effected by one skilled in the art without departing from the spirits or scope of the novel concepts of the invention so that the scope of the invention should be determined by the appended claims only.

We claim as our invention:

1. An apparatus for recording and/or reproducing a signal on a tape recording medium with a plurality of rotary recording and/or reproducing heads, the apparatus comprising:
   a first input and/or output terminal for receiving and/or deriving a video signal;
   a second input and/or output terminal for receiving and/or deriving an audio signal;
   recording and/or reproducing circuit means including rotary transformer means;
   a first rotary recording and/or reproducing head connected to said first input and/or output terminal through said recording and/or reproducing circuit means for recording and/or reproducing said video signal on first parallel slant tracks of a tape recording medium; and
   a plurality of second rotary recording and/or reproducing heads mounted at a fixed angle with respect to said first rotary recording and/or reproducing head and connected to said second input and/or output terminal through said recording and/or reproducing circuit means for recording and/or reproducing said audio signal on second parallel slant tracks of the tape recording medium, a plurality of said second parallel slant tracks containing said audio signal being formed corresponding to each of said first parallel slant tracks containing said video signal.

2. An apparatus according to claim 1, wherein said plurality of second rotary recording and/or reproducing heads are arranged so as not to scan simultaneously said second parallel slant tracks and so that said second parallel slant tracks are laterally displaced on said tape recording medium from said first parallel slant tracks.

3. An apparatus according to claim 2, further comprising a third rotary reproducing head connected to said first input and/or output terminal through said recording and/or reproducing circuit means and for reproducing said video signal on first parallel slant tracks of a tape recording medium.

4. An apparatus according to claim 3, wherein said third rotary reproducing head is a dynamic tracking head.

5. An apparatus according to claim 1, wherein said second input and/or output terminal comprises means for receiving and/or deriving a digital audio signal.

6. An apparatus according to claim 1, wherein said plurality of second rotary recording and/or reproducing heads include a recording head and a reproducing head, said reproducing head being advanced relative to said recording head by a time equal to or greater than time necessary for signal recording and signal reproducing.

7. An apparatus for recording and/or reproducing a signal on a tape recording medium with a plurality of rotary recording and/or reproducing heads, the apparatus comprising:
   a signal input and/or output terminal for receiving and/or deriving an input and/or output signal;
   recording and/or reproducing circuit means including rotary transformer means; and
   a plurality of rotary recording and/or reproducing heads connected to said input terminal through said recording and/or reproducing circuit means for recording and/or reproducing a signal corresponding to said input and/or output signal on the tape recording medium as a plurality of parallel slant video and audio tracks which are formed during one rotation of said plurality of rotary recording and/or reproducing heads, there being a plurality of slant audio tracks on said tape recording medium corresponding to each slant video track on said tape recording medium and said plurality of rotary recording and/or reproducing heads being arranged at predetermined fixed angles with respect to each other so as not to scan simultaneously said parallel slant track and said recording and/or reproducing circuit means further including switching means for conducting said input and/or output signal to and/or from said plurality of rotary recording and/or reproducing heads.

8. An apparatus according to claim 7, wherein said recording and/or reproducing circuit means comprises means for conducting said input and/or output signal to and/or from said plurality of rotary recording and/or reproducing heads as a serial signal.

9. An apparatus according to claim 7, wherein said signal input and/or output terminal comprises means for receiving and/or deriving an input and/or output digital audio signal.

10. An apparatus according to claim 7, further comprising a fixed light source, wherein said recording and/or reproducing circuit means further includes a plurality of switching deices connected to said plurality of rotary recording and/or reproducing heads and a plurality of optical sensors adjacent to and rotating together with said plurality of rotary recording and/or reproducing heads and being connected to said plurality of switching devices, respectively.

11. An apparatus according to claim 10, wherein respective first terminals of said switching devices are connected to said rotary transformer means of said recording and/or reproducing circuit means.

12. An apparatus according to claim 7, wherein said plurality of rotary recording and/or reproducing heads include a recording head and a reproducing head, said reproducing head being advanced relative to said recording head by a time equal to or greater than the time necessary for signal recording and signal reproducing.

* * * * *

UNITED STATES PATENT AND TRADEMARK OFFICE
CERTIFICATE OF CORRECTION

PATENT NO. : 4,814,902

DATED : March 21, 1989

INVENTOR(S) : Jiro Fujiwara et al.

Page 1 of 2

It is certified that error appears in the above-identified patent and that said Letters Patent is hereby corrected as shown below:

Title page:

In U.S. Patent Documents, "4,563,71o" should be --4,563,710--.

Column 1, line 9, delete "an";
          line 14, delete "of".

Column 5, line 11, after "10c" insert --.--;
          line 38, after "system" delete ".";
          line 52, after "B" insert --is--.

Column 7, line 40, change "t" to --at--.

Column 8, line 57, change "reproduce" to --reproduced--.

Column 10, line 27, after "must" insert --be located--.

Column 13, line 22, change "spirits" to --spirit--.

UNITED STATES PATENT AND TRADEMARK OFFICE
CERTIFICATE OF CORRECTION

PATENT NO. : 4,814,902

DATED : March 21, 1989

INVENTOR(S) : Jiro Fujiwara et al

It is certified that error appears in the above-identified patent and that said Letters Patent is hereby corrected as shown below:

IN CLAIMS:

Column 14, line 11, after "than" insert --the--.

line 37, change "track" to --tracks--.

line 5 , change "deices" to --devices--.

Signed and Sealed this

Ninth Day of January, 1990

*Attest:*

JEFFREY M. SAMUELS

*Attesting Officer*     *Acting Commissioner of Patents and Trademarks*